Nov. 5, 1957    R. H. WILLAUER ET AL    2,811,857
CHAIN AND CHAIN LINK
Filed March 21, 1957
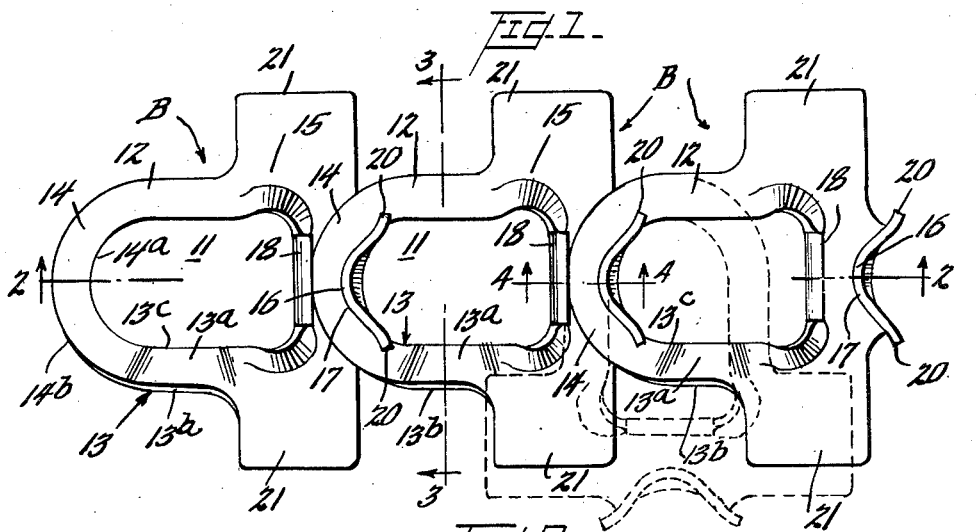
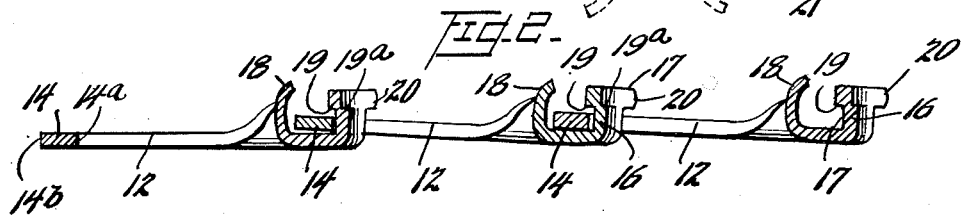
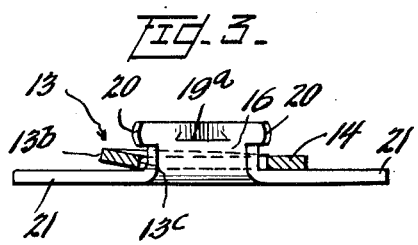
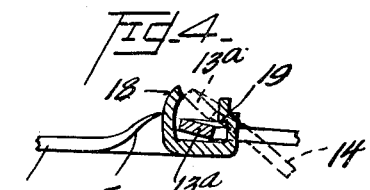
Russell H. Willauer
Paul H. Willauer
INVENTORS
BY Watson, Cole, Grindle & Watson
ATTORNEYS United States Patent Office 2,811,857
Patented Nov. 5, 1957

2,811,857

CHAIN AND CHAIN LINK

Russel H. Willauer and Paul H. Willauer, Quakertown, Pa.

Application March 21, 1957, Serial No. 647,698

9 Claims. (Cl. 74—250)

This invention relates to a chain structure in which the several links of the chain are constructed in a manner to be readily assembled and detached.

Chain structures of this general type have been well known for many years, as evidenced, for instance, by the Mars U. S. Patent 480,853, of August 16, 1892. In such prior art structures it has been customary to provide the side of the body portion of each link with an indentation or indentations arranged to permit application or removal of the hook portion of an adjoining link when the links are relatively swung or rotated to place their major axes at or near right angles to each other. In such structures, however, the formation of the notch or notches has necessarily reduced the overall strength of the link and of the chain, it being necessary in such structures, of course, to have the cross section of the link of greater dimension at its central portion than at such notched or reduced portion in order to prevent inadvertent uncoupling of the chain links.

With the foregoing in mind it is a primary object of the invention to provide a chain and link structure of this general class in which one or both sides of each link may be adapted for ready removal from the hook portion of an adjoining link without in any way weakening or decreasing the cross section of such side. It is a further object to provide such a chain and link construction in which the individual links are especially adapted for formation by conventional sheet metal stamping and forming operations.

Thus, in accordance with the invention, the sides and pintle portion of each link may be formed of equal width, while the hook portion of each said link comprises a pivot and a backstop portion jointly defining an opening therebetween, the pivot having stop means for engagement with the inner edge of the pintle to limit relative tilting between interconnected links in such manner as to prevent the pintle portion from lying over or clearing the backstop. However, in accordance with the novel construction of the invention, one or both sides of the link may be bent or twisted about its longitudinal axis to present the outer edge of at least a portion of such side in the same direction as the pivot, the extent of the twisting being such that when the said twisted portion of the side is positioned between the pivot and backstop relative tilting of the links as above mentioned will result in the outer edge of the twisted portion clearing the backstop to permit uncoupling of the links.

An incidental feature of the foregoing construction is the cooperative relationship of the said backstop and pivot of one link with the pintle of an interconnected or joining link, whereby the backstop maintains the pintle in coaxial journalled relation with the pivot to provide a smooth relative angular movement between the links in a lateral direction, while at the same time avoiding relative longitudinal movement between such interconnected links such as might result in their becoming relatively cocked or tilted in a manner to result in kinking, as can occur where a longitudinal movement between links is permitted.

The foregoing, as well as other incidental objects and advantages, are all attained by the preferred embodiment of the invention shown in the accompanying drawings in which:

Figure 1 is a plan view of a section of chain utilizing the links of the invention, the right hand link being shown in dotted lines in the position assumed by it incident to its uncoupling from the adjoining link;

Figure 2 is a section on the line 2—2 of Figure 1;

Figure 3 is a section on the line 3—3 of Figure 1; and

Figure 4 is a section on the line 4—4 of Figure 1, the right hand link of Figure 1 being in its broken line position and showing in broken lines the final position assumed by said right hand link incident to the uncoupling operation.

Referring now in detail to the accompanying drawings, there is shown a portion of a chain in accordance with the invention including several interconnected links. Each of said links comprises a preferably integral structure of heavy guage sheet metal or other rigid material. Each link comprises a generally flat body B formed with an elongated opening 11 therein extending lengthwise of the body and the chain in its entirety. The body includes relatively transversely spaced longitudinal sides 12 and 13, respectively, and transversely disposed ends 14 and 15 extending between and interconnecting the sides at the opposite ends of the opening 11.

One of the ends 14 constitutes a flat pintle having inner and outer edges 14a and 14b, respectively, curved concentrically about a pivotal axis located within the opening 11 on the major longitudinal axis of the link and the chain. It will be seen that both the sides 12 and 13 and the pintle 14 are of equal width around the opening 11 and also the end 15 is preferably of a width at least equal to that of the said sides and end 14 whereby it will be seen that the link is of relatively uniform strength throughout and has no weakened zone or portion such as might be present in a tapered or notched link structure.

The end 15 of the link functions as the hook portion thereof for cooperation with the pintle 14 of an adjoining or interconnected link. For this purpose the end 15 includes a preferably integral pivot 16 projecting normally from the plane of the body B through the opening 11 in the body of a joining link and having a transversely convex bearing surface 17 normally in concentric journalled relation to the inner edge 14a of said pintle of the adjoining link. It will be seen that the convex bearing surface 17 is concentric to an axis which is located along the major longitudinal axis of its own link but spaced therefrom. In the illustrated embodiment the pivot 16 comprises a tab formed integrally with its associated link along the longitudinally presented edge of the end 15 and turned upwardly at right angles to the plane of the body of said link, the pivot then being bent or curved by suitable stamping or pressing operations to provide the convex bearing surface 17.

A backstop 18 which will be seen to comprise another portion of the hook structure may be suitably formed from an integral tab at the inner edge of the end 15 bent upwardly normally to the body in the same direction as the pivot 16. Stop 18 is fixedly spaced from the pivot in a longitudinal direction a distance substantially equal to the width of the pintle of the joining link for maintaining such pintle at all times in concentric relation with its inner edge 14a in journalled bearing engagement with the convex bearing surface 17 of the pivot. In other words it will be apparent that the spacing of the pivot and its associated backstop will be sufficient to permit free swinging of the pintle 14 about its pivot 16 but without permitting any appreciable relative longitudinal movement between joining links.

A stop or downwardly directed abutment 19 projecting radially outwardly from the pivot 16 in spaced relation to the plane of the body B and overlying the pintle 14 of the adjoining link serves to restrict relative tilting of the adjoining or interconnecting links about a transverse axis in the plane parallel to the bodies of the links. The position of the stop 19 is such as will restrict the relative tilting between interconnected links to a range wherein the outer edge 14b of the pintle of one link will be at all times in abutting relation with the backstop 18 of its interconnected link throughout the entire range of such tilting movement. In other words the backstop 18 is angularly coextensive with the path generated by the outer edge 14b of the associated pintle throughout the range of its said tilting movement.

Normally, therefore, as long as the pintle of one link is operatively associated with the hook portion or end of an adjoining link it will be impossible to uncouple the said links.

The aforementioned stop 19 may obviously assume any of a number of forms though in the embodiment shown it is formed by providing a slot 19a through the pivot 16 parallel to the plane of body B and spaced therefrom and by stamping or pressing the free end portion of the pivot above said slot radially outwardly from the convex bearing surface 17 of the pivot in a manner whereby it will overlie and limit the tilting movement of the pintle of an adjoining link in the manner above mentioned.

For the purpose of permitting ready assembling and uncoupling of adjoining links of the chain one of the sides shown as the side 13 in the instant embodiment will have a medial portion 13a twisted about its longitudinal axis so as to be angularly displaced from the plane of the body in a direction to present the outer edge 13b of said side generally in the direction of the pivot 16. It is desirable though not essential that as an incident to such bending the inner edge 13c of the same side be offset generally downwardly or on the opposite side of the plane of the body B from the edge 13b.

The extent of the twisting or angular displacement of such side portion 13a is such that when this portion is positioned between the pivot 16 and backstop 17 of an associated link and tilted relatively thereto as shown in the drawings the outer edge 13b of the medial portion will be positioned to clear the backstop to permit uncoupling of the links by relative bodily longitudinal movement thereof at an angle to the plane of one of the links.

Obviously the stops 19 of the several links will restrict the range of permissible tilting movement between the links as above defined in either direction. However, for the purpose of supplementing such action of the stops 19 at least in one direction as well as to positively prevent uncoupling of the links as long as their respective pintle and pivot portions are in journalled relation, there may be provided supplemental means 20. Such means 20 are shown as comprising retainer lugs projecting in opposite lateral directions from each of the pivots 16 in spaced relation to its body B and beyond the edges of the opening 11 of an interconnected link to overlie the sides 12 and 13 of such link.

Also, where the several interconnected links are utilized to form a conveyer chain for which purpose they are eminently adapted, they may be provided with sweeps 21 extending laterally outwardly from opposite sides of their hook end 15.

From the foregoing description it will be apparent that the chain structure of the present invention embodies a novel link construction arranged to permit ready coupling and uncoupling of adjoining links without weakening any portions of the links or the overall chain structure and moreover the resulting link structure is such as is particularly well adapted for economical formation by metal stamping and bending process well known in the art.

In this application we show and describe only the preferred embodiment of the invention. However, we recognize that the invention is readily susceptible of modification without departure from our inventive concept. Accordingly, the drawings and description herein are to be construed as merely illustrative in nature and not as restricting the scope of our invention otherwise than as expressly set forth in the accompanying claims.

Having thus described our invention we claim:

1. A chain of rigid sheet metal links, each comprising an integral generally flat body formed with an elongated opening therein extending lengthwise of the body and chain, said body including transversely spaced longitudinally extending sides and transversely extending ends connecting the sides, one of said ends constituting a flat pintle having inner and outer edges curved concentrically about a pivotal axis located within said opening, said sides and said pintle being of equal width around said opening, the other said end including an integral pivot projecting normally from the plane of said body through the opening in the body of an adjoining link and having a transversely convex bearing surface normally in concentric journalled relation to said pintle of the adjoining link, a backstop projecting from said pivot end of the body in the same direction as said pivot and fixedly spaced from said pivot a distance substantially equal to the width of said pintle of the adjoining link, for maintaining said last mentioned pintle in concentric relation on said pivot, a stop projecting from said pivot in spaced relation to the plane of said body and overlying said pintle of the adjoining link for restricting the relative tilting between said links about a transverse axis to maintain said outer edge of the pintle in abutting relation with said backstop being accurately curved in conformity with the path generated by said outer edge incident to said tilting movement and coextensive with said path, one of said sides having a medial portion angularly displaced from the plane of said body about a longitudinal axis to present the outer edge of said side generally in the direction of said pivot, whereby when said medial portion is positioned between said pivot and said backstop of an associated link and tilted relative thereto said outer edge of the medial portion may be caused to clear the backstop to permit disassembly of the links.

2. A chain of rigid sheet metal links, each comprising an integral generally flat body formed with an elongated opening therein extending lengthwise of the body and chain, said body including transversely spaced longitudinally extending sides and transversely extending ends connecting the sides, one of said ends constituting a flat pintle having inner and outer edges curved concentrically about a pivotal axis located within said opening, said sides and said pintle being of equal width around said opening, the other said end including an integral pivot projecting normally from the plane of said body through the opening in the body of an adjoining link and having a transversely convex bearing surface normally in concentric journalled relation to said pintle of the adjoining link, a backstop projecting from said pivot end of the body in the same direction as said pivot and fixedly spaced from said pivot a distance substantially equal to the width of said pintle of the adjoining link, for maintaining said last mentioned pintle in concentric relation on said pivot, a stop projecting from said pivot in spaced relation to the plane of said body and overlying said pintle of the adjoining link for restricting the relative tilting between said links about a transverse axis to maintain said outer edge of the pintle in abutting relation with said backstop throughout the range of said tilting movement, said backstop being coextensive with the path generated by said outer edge incident to said tilting movement, one of said sides having a medial portion angularly displaced from the plane of said body about a longitudinal axis to present the outer edge of said side generally in the direction of said pivot, whereby when said medial portion is positioned between said pivot and said backstop of an associated link and tilted relative thereto said outer edge of the medial portion may be caused to clear the backstop to permit disassembly of the links.

3. A chain of rigid sheet metal links, each comprising a generally flat body formed with an elongated opening therein extending lengthwise of the body and chain, said body including transversely spaced longitudinally extending sides and transversely extending ends connecting the sides, one of said ends constituting a flat pintle having inner and outer edges curved concentrically about a pivotal axis located within said opening, said sides and said pintle being of equal width around said opening, the other said end including a pivot projecting normally from the plane of said body through the opening in the body of an adjoining link and having a transversely convex bearing surface normally in concentric journalled relation to said pintle of the adjoining link, a backstop projecting from said pivot end of the body in the same direction as said pivot and fixedly spaced from said pivot a distance substantially equal to the width of said pintle of the adjoining link, for maintaining said last mentioned pintle in concentric relation on said pivot, a stop projecting from said pivot in spaced relation to the plane of said body and overlying said pintle of the adjoining link for restricting the relative tilting between said links about a transverse axis to maintain said outer edge of the pintle in abutting relation with said backstop throughout the range of said tilting movement, one of said sides having a portion angularly displaced from the plane of said body about a longitudinal axis to present the outer edge of said side generally in the direction of said pivot, whereby when said medial portion is positioned between said pivot and said backstop of an associated link and tilted relative thereto said outer edge of the medial portion may be caused to clear the backstop to permit disassembly of the links.

4. The combination of claim 3 including retainer lugs projecting in opposite lateral directions from said pivot a distance in excess of the width of said opening of an adjoining link to prevent uncoupling of the links when in generally longitudinal alignment, and to limit the range of tilting therebetween in one direction.

5. The combination of claim 3, including sweeps projecting laterally from opposite sides of said pivot end.

6. A rigid sheet metal chain link, comprising an integral generally flat body formed with an elongated opening therein extending lengthwise of the body, said body including transversely spaced longitudinally extending sides and transversely extending ends connecting the sides, one of said ends constituting a flat pintle having inner and outer edges curved concentrically about a first pivotal axis located within said opening, said sides and said pintle being of equal width around said opening, the other said end including an integral pivot projecting normally from the plane of said body and having a transversely convex bearing surface concentric to a second pivotal axis spaced longitudinally from said link, a backstop projecting from said pivot end of the body in the same direction as said pivot and fixedly spaced from said pivot a distance substantially equal to the width of said pintle, a stop projecting from said pivot in spaced relation to the plane of said body, said backstop being accurately curved about the intersection of said pivot and said link body in a plane normal to and longitudinally bisecting the link body, one of said sides having a medial portion angularly displaced from the plane of said body about a longitudinal axis to present the outer edge of said side generally in the direction of said pivot.

7. A rigid sheet metal chain link, comprising an integral generally flat body formed with an elongated opening therein extending lengthwise of the body, said body including transversely spaced longitudinally extending sides and transversely extending ends connecting the sides, one of said ends constituting a flat pintle having inner and outer edges curved concentrically about a pivotal axis located within said opening, said sides and said pintle being of equal width around said opening, the other said end including an integral pivot projecting normally from the plane of said body and having a transversely convex bearing surface concentric to an axis spaced longitudinally from said link, a backstop projecting from said pivot end of the body in the same direction as said pivot and fixedly spaced from said pivot a distance substantially equal to the width of said pintle, a stop projecting from said pivot in spaced relation to the plane of said body, said backstop being generally angularly coextensive with said space between the stop and said body about an origin coincident with the intersection of said body and said pivot, one of said sides having a medial portion angularly displaced from the plane of said body about a longitudinal axis to present the outer edge of said side generally in the direction of said pivot.

8. A sheet metal link, comprising an integral generally flat body formed with an elongated opening therein extending lengthwise of the body, said body including transversely spaced longitudinally extending sides and transversely extending ends connecting the sides, one of said ends constituting a flat pintle having inner and outer edges curved concentrically about a pivotal axis located within said opening, said pintle being of equal width around said opening, the other said end including an integral pivot projecting normally from the plane of said body through the opening in the body of an adjoining link and having a transversely convex bearing surface concentric to an axis spaced longitudinally from said link, a backstop projecting from said pivot end of the body in the same direction as said pivot and fixedly spaced from said pivot a distance substantially equal to the width of said pintle, a stop projecting from said pivot in spaced relation to the plane of said body, one of the said sides having a medial portion angularly displaced from the plane of said body about a longitudinal axis to present the outer edge of said side generally in the direction of said pivot.

9. The combination of claim 8 including retainer lugs projecting in opposite lateral directions from said pivot in spaced relation to said body and beyond the edges of said opening.

References Cited in the file of this patent
UNITED STATES PATENTS 2,789,439     Willauer _____ Apr. 23, 1957